United States Patent
Yamamoto

(10) Patent No.: US 9,141,898 B2
(45) Date of Patent: Sep. 22, 2015

(54) PRINTING CONTROL APPARATUS CONTROLLING A PRINTING UNIT TO PRINT AN IMAGE CORRESPONDING TO PRINT MEDIUM SIZE

(71) Applicant: CANON KABUSHIKI KAISHA, Tokyo (JP)

(72) Inventor: Hiroyuki Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/316,542

(22) Filed: Jun. 26, 2014

(65) Prior Publication Data

US 2015/0002864 A1 Jan. 1, 2015

(30) Foreign Application Priority Data

Jun. 28, 2013 (JP) .................................. 2013-137043

(51) Int. Cl.
*G06F 3/12* (2006.01)
*G06K 15/00* (2006.01)

(52) U.S. Cl.
CPC .......... *G06K 15/4065* (2013.01); *G06F 3/1208* (2013.01); *G06F 3/1255* (2013.01); *G06F 3/1288* (2013.01); *G06K 15/402* (2013.01)

(58) Field of Classification Search
None
See application file for complete search history.

(56) References Cited

U.S. PATENT DOCUMENTS

| | | | |
|---|---|---|---|
| 7,173,718 B2* | 2/2007 | Iwata et al. | 358/1.13 |
| 2002/0163665 A1* | 11/2002 | Iwata et al. | 358/1.15 |
| 2006/0075909 A1* | 4/2006 | Hoshi et al. | 101/114 |
| 2007/0195336 A1* | 8/2007 | Uotani | 358/1.1 |

FOREIGN PATENT DOCUMENTS

JP 2013-37547 A 2/2013

* cited by examiner

*Primary Examiner* — Jeremiah Bryar
(74) *Attorney, Agent, or Firm* — Canon USA, Inc. I.P. Division

(57) ABSTRACT

A printing control apparatus prints an image in a size corresponding to a print medium size candidate if a candidate of a print medium size acquired by detecting a print medium size with a sensor is included in a plurality of sizes acceptable for printing in print setting.

24 Claims, 12 Drawing Sheets

FIG.9

| ID | PRINT DATA SHEET SIZE | PRINTABLE SHEET SIZE | SHEET SIZE PRINTABLE BY CHANGING MAGNIFICATION |
|---|---|---|---|
| 0001 | A4 | A4 | — |
| 0002 | A5 | A5 | — |
| 0003 | B5 | B5 | — |
| 0004 | LETTER | LETTER | — |
| 0005 | SPECIAL001 | A4, LETTER | B5 |
| 0006 | SPECIAL002 | A4, LETTER, B5 | — |

FIG.12

| ID | PRINT DATA SHEET TYPE | PRINTABLE SHEET TYPE |
|---|---|---|
| 0001 | PLAIN PAPER | PLAIN PAPER |
| 0002 | RECYCLED PAPER | RECYCLED PAPER |
| 0003 | GLOSS PHOTO PAPER A | GLOSS PHOTO PAPER A |
| 0004 | GLOSS PHOTO PAPER B | GLOSS PHOTO PAPER B |
| 0005 | SPECIAL001 | PLAIN PAPER, RECYCLED PAPER |
| 0006 | SPECIAL002 | GLOSS PHOTO PAPER A, GLOSS PHOTO PAPER B |

PRINTING CONTROL APPARATUS CONTROLLING A PRINTING UNIT TO PRINT AN IMAGE CORRESPONDING TO PRINT MEDIUM SIZE

BACKGROUND OF THE INVENTION

1. Field of the Invention

The present invention relates to a printing control apparatus configured to control a printing apparatus to print an image, a printing control method, and a storage medium.

2. Description of the Related Art

Recently, there is a cloud print service that a print server on the Internet transmits print target data to a printer via the Internet and causes the printer to print the data as a cloud service. In this cloud print service, a user gives an instruction for printing to the print server via an apparatus such as a personal computer and the print server which receives the print instruction causes the printing apparatus to execute printing.

In such an environment, sometimes a paper error occurs since the print sheet size of the print target data does not match the size of the print sheet placed in the printing apparatus. Japanese Patent Application Laid-Open No. 2013-37547 discloses a technique by which a print server acquires sheet size information of a printer, and compares the sheet size of print target data and the size indicated by the sheet size information acquired from the printer. Then, when those sizes do not match, the print target data is converted into a sheet size printable by the printer.

For example, if print target data is data such as a print test pattern or access information like a uniform resource locator (URL) to a registration site for a print service user registration or a one-time password, the printing may be enough as long as the printed content can be recognized by the user. In the case that such contents are the print target, the contents may be printed and sufficiently recognized even when the size of the image to be printed does not match the size of the print sheet set on the printer.

When the print data conversion process like the technique described in Japanese Patent Application Laid-Open No. 2013-37547 is executed in printing of such print target data, the conversion process may cause a delay in outputting the print target data and the printing cannot be executed promptly.

SUMMARY OF THE INVENTION

The present invention is direct to a printing control apparatus, a printing control method, and a storage medium, which can execute appropriate printing when a predetermined size of a print medium is set to print target data.

Further features of the present invention will become apparent from the following description of exemplary embodiments with reference to the attached drawings.

BRIEF DESCRIPTION OF THE DRAWINGS

FIG. 9 is a diagram illustrating a sheet size correspondence table stored in the sheet size determination unit of the printer.

FIG. 12 is a diagram illustrating a sheet type correspondence table stored in a sheet type determination unit of the printer.

DESCRIPTION OF THE EMBODIMENTS

Various exemplary embodiments, features, and aspects of the invention will be described in detail below with reference to the drawings.

As an exemplary embodiment, a cloud print service will be described. As an example of print target data, printing an "invitation page" on which access information such as a URL to a registration site or a one-time password for use in a cloud print service is printed will be described. A user is sometimes required to operate a printer connected to the cloud print service in advance to print an invitation page. The user accesses to a user registration page from a web browser on the user's terminal via the URL written on the invitation page, and completes a registration using the one-time password printed on the invitation page. After completing the registration, the user can execute printing in the printer by transmitting print data to the cloud print service from the web browser even if a printer driver has not been installed to the user's terminal.

Regarding the invitation page which is required to be printed in the above manner, the URL or one-time password shown thereon is content information which is always different, but other print contents thereon may be always written in the same format. Thus, in view of a server resource, regarding the invitation page, it is desirable that print data of a stylized format which can be used in common by all printers is stored in a server. On the other hand, when using a stylized format, there is a possibility that a print sheet size set to the printer and a sheet size corresponding to print data of the invitation page do not match when the invitation page is printed. The present exemplary embodiment describes a method for executing an appropriate printing by promptly outputting data to be printed when printing a predetermined type of print target data.

Figure 1:
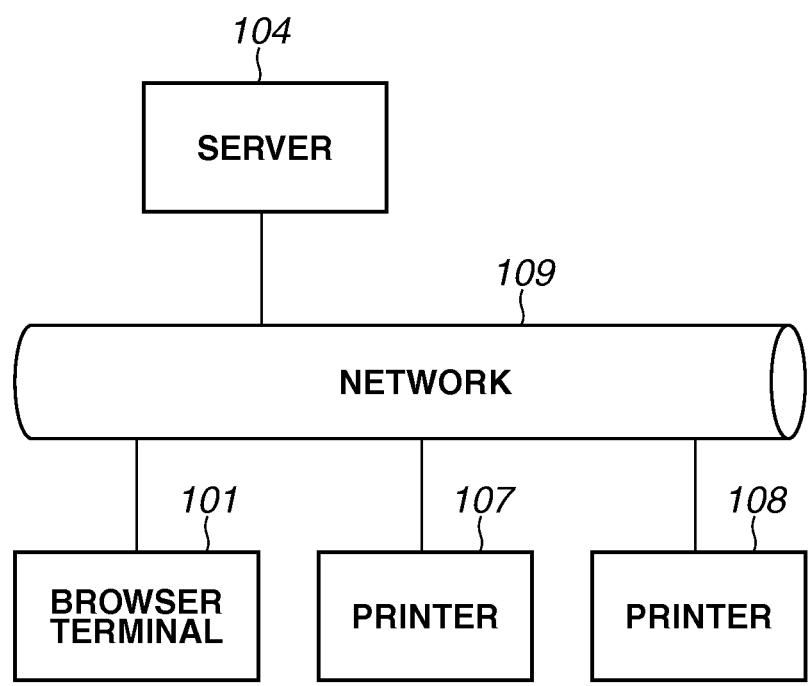
FIG. 1 is a block diagram illustrating a network configuration.

FIG. 1 is a diagram illustrating an entire configuration of a printing system according to an exemplary embodiment. In FIG. 1, a browser terminal 101, a server 104, and printers 107 and 108 are connected one another via a network 109.

The browser terminal 101 is a personal computer or a smart device such as a smartphone and a tablet computer and can access to the server 104 on the network via a web browser. The server 104 can receive a print request of the invitation page from the browser terminal, for example. Further, the server 104 receives print target data such as a document or a photograph transmitted from the browser terminal, generates print data based on the received data, and transmits the data to the printer. The printer can print an image based on the print data received from the server 104 on a print sheet with a print engine. For example, the user can transmit a print request of data such as a document to the server 104 via the browser terminal 101 and print an image based on the data for which the print request is sent to the printer 107 and 108.

The user sometimes executes a user registration process using the browser terminal 101 before the user uses the printing system via the server 104 as described above. More specifically, the user executes printing of a URL and a one-time password, which are required in a user registration process, as an invitation page in the printer. Then, the user accesses to the server 104 based on the URL via the browser terminal 101 and informs the server 104 of the one-time password via the browser terminal 101 to execute the user registration process. In the invitation page printing, when the user requests the server 104 to print the invitation page via the printer, the server 104 transmits print data to the printer in response to the request and the printer prints the invitation page.

Here, the browser terminal 101 and the printer 107 and 108 incorporate an environment where a web browser (as an Internet browser, a WWW browser, or a browser for using the World Wide Web) is realized. The network 109 is, for example, a communication network realized by the Internet.

<Hardware Configuration>

Figure 2:
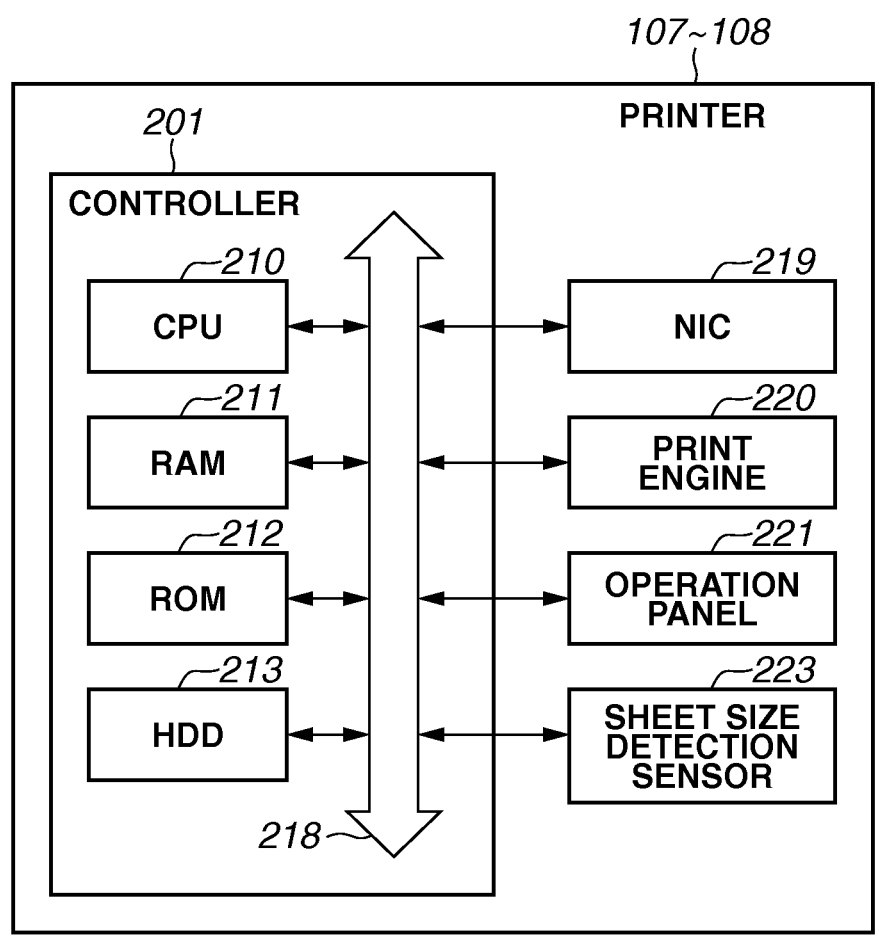
FIG. 2 is a hardware configuration diagram of a printer in a printing system according to a present exemplary embodiment.

FIG. 2 is a hardware configuration diagram of the printer 107 and 108 in the printing system according to the present exemplary embodiment. In FIG. 2, a controller 201 of the printer 107 and 108 controls each component of the printer. A central processing unit (CPU) 210 in the controller 201 comprehensively controls access to various devices connected to a system bus 218. A read only memory (ROM) 212 stores various control programs which are executed by the CPU 210. A random access memory (RAM) 211 functions as a main memory, a work area, or the like of the CPU 210. The CPU 210 can control the printer 107 and 108 by executing the programs stored in the ROM 212 using the RAM 211 as a working memory.

A hard disk drive (HDD) 213 stores a print module program, and other various programs. An operation panel 221 includes an operation device with which the user performs operation and a display panel that displays various information such as an image or a web browser image. The operation panel 221 may have a configuration of various types. For example, the display and the operation device such as a key may be provided separately or a touch panel may be provided in the display. The user can give various instructions to the CPU 210 by operating the operation panel 221. A network interface card (NIC) 219 is an interface for performing data communication with an external device.

A print engine 220 prints a print target image rasterized in the RAM 211 on a print sheet. For example, printing is executed by an electrophotographic type method (laser beam type), an ink jet type method, a dye-sublimation (thermal-transfer) type method, or the like.

A sheet size detection sensor 223 is a sensor for detecting the size of print sheets placed in the printer 107 and 108. In a sheet size detection method, a sensor provided on a conveyance path on which the print sheet is conveyed, in the printer detects a width of the conveyed print sheet in a direction perpendicular to the conveying direction and determines a standard sheet size corresponding to the detected width as the size of the print sheet. As another detection method, a sensor provided in a sheet cassette where a user places print sheets may detect the size of print sheets placed in the sheet cassette.

Although the configuration of the printer has been described with reference to FIG. 2, the server 104 also includes the CPU 210, RAM 211, and ROM 212 similar to the printer. The CPU 210 executes programs stored in the ROM 212 using the RAM 211 to realize processes in the server 104.

Further, the server 104 is not limited to a single device and a plurality of devices (servers) may share the processes and operate as the server 104 of the present exemplary embodiment.

Each module, each service, and each step of flowcharts of the present exemplary embodiment are realized when the CPUs 210 of the server 104 and printer 107 and 108 execute the programs stored in the ROMs 212.

<System Configuration>

Figure 3:
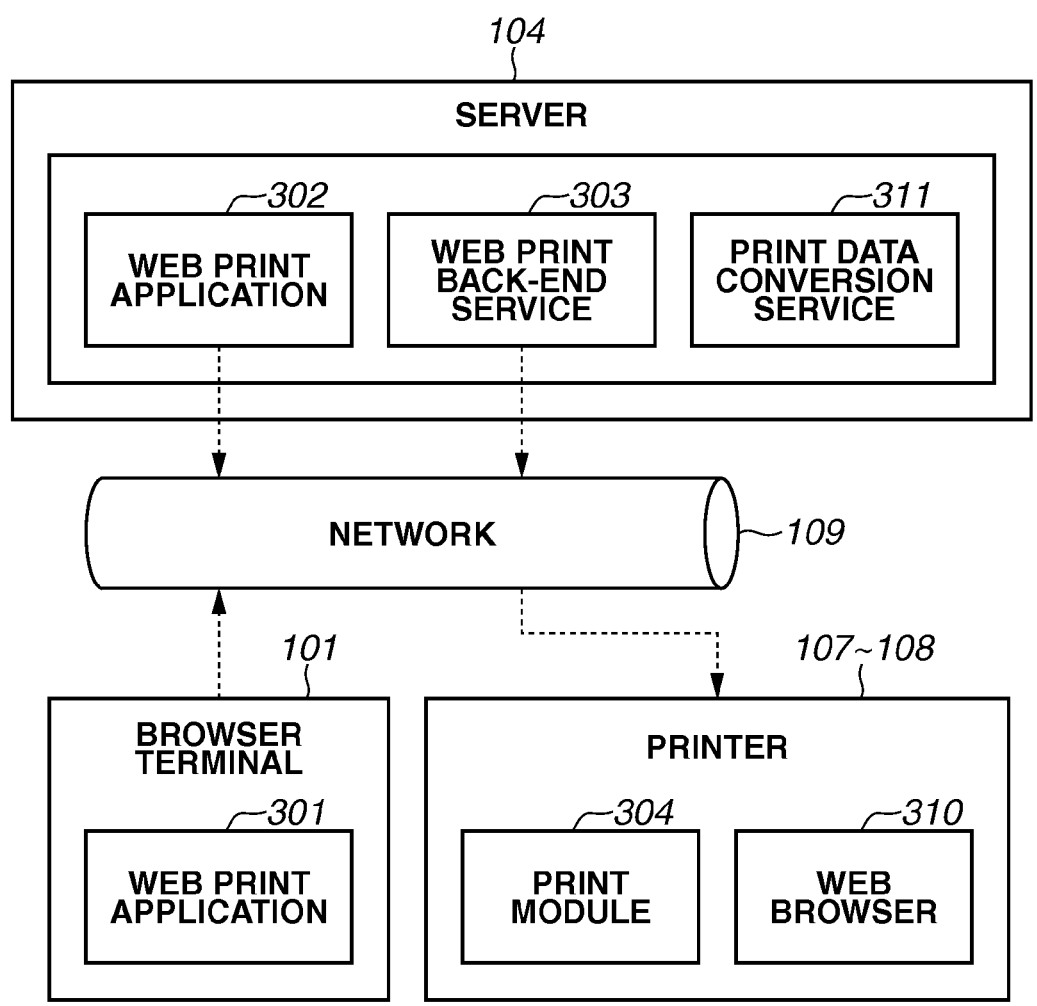
FIG. 3 is a system configuration diagram of the printing system according to the present exemplary embodiment.

FIG. 3 is a system configuration diagram of the printing system according to the present exemplary embodiment. A web print application 302 creates a web page which can be viewed by a web browser 310 operating in the printer 107 and 108, responds to a request from the web browser 310, and returns the created web page in response to the request.

In a user registration process, the server 104 receives a print request of the invitation page from the printer via the web print application 302. When the server 104 receives the print request, the web print application 302 generates a URL of a registration site and a one-time password to be written on the invitation page and arranges such information in a stylized format to create the invitation page. Then, the web print application 302 transmits data of the created invitation page to a print data conversion service 311. Further, the web print application 302 receives a print request from the user who has received the information via the browser terminal 101, and transmits print target data corresponding to the print request to the print data conversion service 311. Here, in the present exemplary embodiment, the print target data may be received from the browser terminal 101. Further, the user makes a print request for the print target data stored in the server 104, and the data specified by the print request may become the print target.

The print data conversion service 311 converts the data of the invitation page received from the web print application 302 and the print target data specified by the user of the browser terminal 101 into print data printable by the printer and manages the converted print data.

When the print data conversion service 311 completes generating the print data, a web print back-end service 303 transmits a print start request to a print module 304 of the printer 107 and 108. Further, in response to a print data request from the print module 304 of the printer 107 and 108, the web print back-end service 303 returns a download pointer of the print data. The download pointer is information in which a location of the print data is written in a format identifiable by a computer and is expressed as a URL, for example. Further, the web print back-end service 303 returns the print data in response to a download request from the print module 304. The print module 304 of the printer 107 and 108 receives the print start request from the web print back-end service 303, transmits the print data request to the web print back-end service 303, and obtains the download pointer of the print data. Further, based on the received download pointer of the print data, the print module 304 requests the print data from the web print back-end service 303.

The web print application 302, web print back-end service 303, and print data conversion service 311 are respectively independent programs and may be provided in separate information processing apparatuses. These programs are respectively provided in the information processing apparatuses which are connected to a network and communicate with one another. Further, these programs may be executed in a single information processing apparatus.

Regarding the system configuration, an example that the all services are included in the server 104 has been described; however, these services may be provided in separate severs or combinations of services may be executed in each individual server.

<Software Configurations of Server and Print Module>

Figure 4:
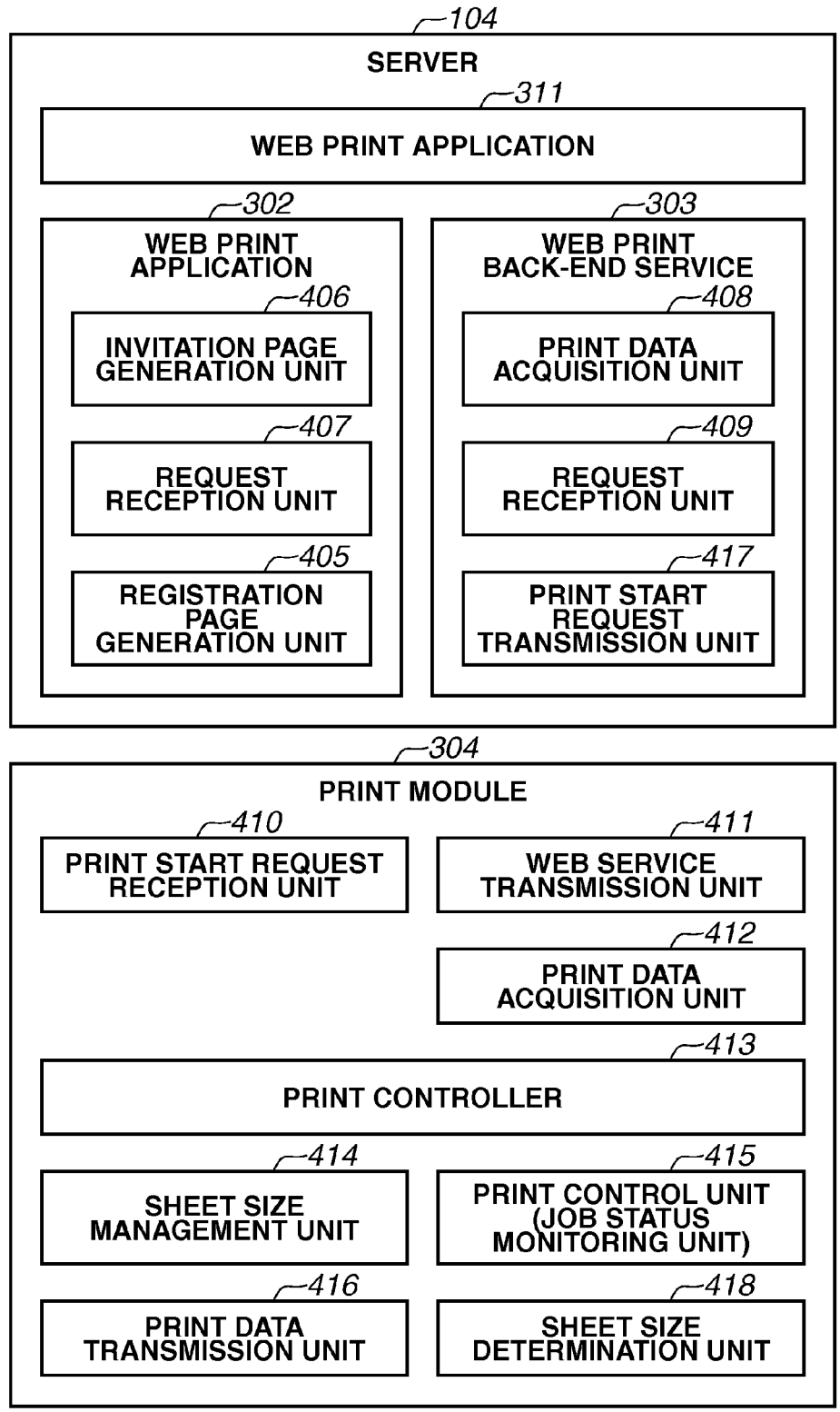
FIG. 4 is a software configuration diagram of the printing system according to the present exemplary embodiment.

FIG. 4 is a software configuration diagram of the printing system according to the present exemplary embodiment. The print data conversion service 311 installed in the server 104 converts the invitation page generated by the web print application 302 and the print target data for printing which is requested and transmitted from the user, into print data to be printed by the printer, and manages the data. When a print data acquisition request is received from the web print back-end service 303, the print data conversion service 311 transfers the print data to the web print back-end service 303.

Figure 5:
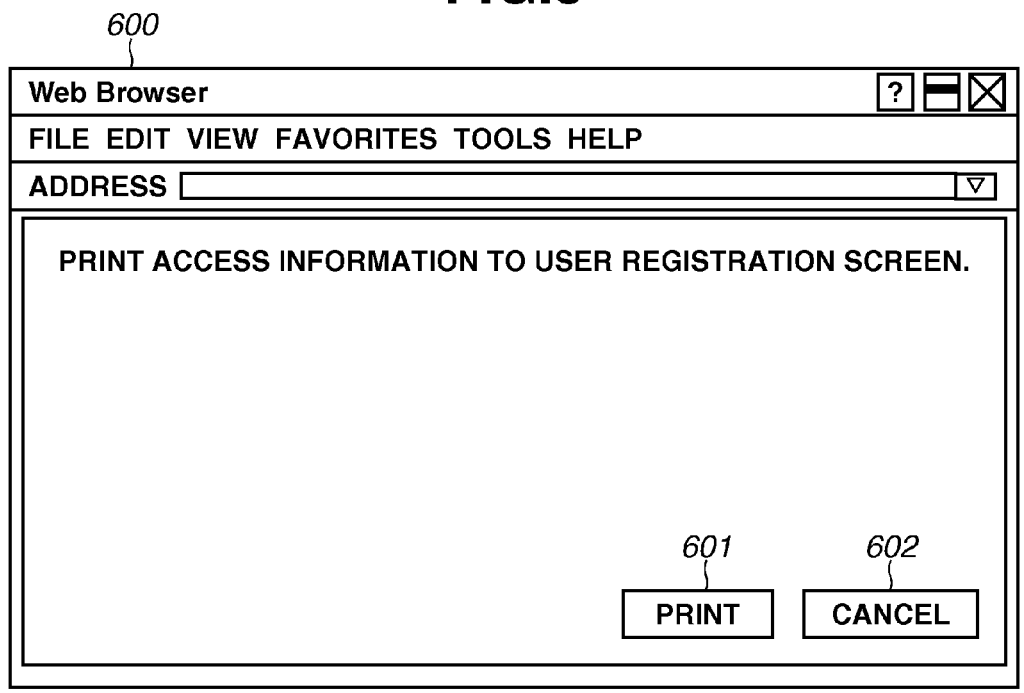
FIG. 5 is a diagram illustrating an invitation page print screen from a web browser to a print server.

An invitation page generation unit 406 of the web print application 302 generates a later described web screen 600 illustrated in FIG. 5 in response to the request from the web browser 310 and transmits the web screen 600 to the web browser 310. Thus, the web screen 600 illustrated in FIG. 5 is displayed on the operation panel 221 by the web browser 310.

A registration page generation unit 405 of the web print application 302 creates a web screen (not illustrated) used for a user registration in response to the request from the web browser 301 of the browser terminal 101, which is transmitted to the URL printed on the invitation page, and returns the page to the web browser 301. Then, the web browser 301 displays the screen for the user registration on the operation panel 221. The user operates the operation panel 221 and inputs registration information such as the one-time password required for the user registration using a form displayed on the web screen. The web browser 310 transmits the registration information input by the user to the web print application 302. Then, when the server 104 stores the registration information in a predetermined memory, the user registration process is completed.

A print start request transmission unit 417 of the web print back-end service 303 transmits a print start request to the print module 304 of the printer. More specifically, the web print application 302 receives the print request of the invitation page from the web browser 310 and, when the print data conversion service 311 completes converting of the print data, a print start request is transmitted.

A request reception unit 409 receives a print data acquisition request from the print module 304 of the printer. When the request reception unit 409 receives the print data acquisition request, a print data acquisition unit 408 transmits a print data acquisition request to the print data conversion service 311.

The print start request reception unit 410 of the print module 304 of the printer receives a print start request from the print start request transmission unit 417 of the web print back-end service 303. When the print start request is received from the web print back-end service 303, the print data acquisition unit 412 acquires the print data from the web print back-end service 303 via a web service transmission unit 411 and transmits the data to the print data transmission unit 416. The web service transmission unit 411 notifies the web print back-end service 303 of the server 104 of the print data request. The print data transmission unit 416 transmits the print data to the controller 201 of the printer. A print controller 413 manages the entire operation of the print module 304 and operation commands to each unit and the like are sent via the print controller 413.

A sheet size management unit 414 stores, in the RAM 211, the detection results when the sheet size detection sensor 223 detects the size of the print sheet placed in the printer. According to the present exemplary embodiment, the detection of the size of the printing sheet is executed when a print start request is received. Here, the detection result by the sheet size detection sensor 223 may uniquely identify a single sheet size or identify a plurality of sheet sizes as candidates of sheet sizes set to the printer. For example, when the sheet size detection sensor 223 detects the width of the print sheet and there is a plurality of standard sizes which has widths closer to the detected width, the plurality of standard sizes is used as candidates.

A sheet size determination unit 418 compares the print sheet size candidate which is identified by the sheet size detection sensor 223 and managed by the sheet size management unit 414 with a sheet size set as the print data acquired by the print data acquisition unit 412. Then, the sheet size determination unit 418 determines whether a print sheet in the size suitable for printing the print target data is placed in the printer. Further, to make the above determination in the sheet size determination unit 418, the ROM 212 stores correspondence information of sheet sizes corresponding to a predetermined type of print data and sheet sizes corresponding thereto. The sheet size determination unit 418 determines with reference to the correspondence information stored in the ROM 212. In the correspondence information, as a sheet size of the predetermined type of print data, the sheet size for the invitation page is registered. As the sheet size, a sheet size for instructing the printer not to change the magnification of the print target data according to the sheet size of the printer is associated.

A print control unit 415 monitors a status of a print job executed in the printer. For example, when the sheet size set as the print target data is not found in the sheet size candidates of the print sheets identified by the sheet size detection sensor 223, the print control unit 415 outputs an error without executing the printing.

A table 1100 of FIG. 9 is a table showing the correspondence information between the sheet sizes set as the print target data and the sheet sizes identified by the sheet size detection sensor 223 and is referred by the sheet size determination unit 418.

An ID (identification) 1101 is an ID used for managing determination information of this table. A sheet size 1102 is a sheet size identified by print data to be set as the print target data. A sheet size 1103 is a size in which the print target data specified by the sheet size 1102 of the print data can be printed without being converted to adjust to the print sheet size identified by the sheet size detection sensor 223. A sheet size 1104 is a size in which the print target data specified by the sheet size 1102 can be printed if converted to adjust to the sheet size identified by the sheet size detection sensor 223.

The sheet size determination unit 418 identifies the ID 1101 of the sheet size 1102 of the print data, which matches the sheet size designated for the print target data, in the table 1100. Then, the sheet size determination unit 418 determines whether the printable sheet size 1103 defined for the identified ID 1101 matches the sheet size identified by the sheet size detection sensor 223. Here, as seen in the print data sheet sizes 1102 of "0005" and "0006" of the ID 1101, there are special sheet sizes ("SPECIAL 001," "SPECIAL 002" in the table) for which a plurality of printable sheet sizes 1103 can be specified. In the example of FIG. 9, the printable sheet size 1103 for the special sheet size is previously defined as a sheet size that accepts a plurality of sheet sizes. However, in addition to the above, a special setting value may be defined as a sheet size to be specified in print setting, and any of the printable sheet sizes 1103 of A4, A5, B5, and Letter may be determined as printable when the special setting value is set.

As described above, according to the present exemplary embodiment, the special sheet size is defined as one of options in sheet size setting which is one of print setting commands. A print server sets an option of this special sheet size in the print setting and adds the print setting command to the print job. With this structure, out of the sheet sizes identified by the sheet size detection sensor 223, a plurality of sheet sizes which are acceptable for printing can be specified.

Further, according to the present exemplary embodiment, to specify a sheet size acceptable for printing, designation is executed by setting a sheet size for the print setting. In other words, for example, since the printer server executes the above designation, the designation can be appropriately executed without providing a particular command for adjusting or controlling a determination standard of a sheet size detection function. Thus, it is not necessary to change a schema of the print setting commands, so that an impact on the web print application 302 and the entire printing system is small. Further, compared with the case that a dedicated command for adjusting or controlling the determination standard of the sheet size detection function is provided between the server 104 and the printer 107 and 108, operational cost can be reduced because data communication traffic is not increased.

In the above description, the sheet size detection function identifies a print sheet size (width and length of a print sheet); however, other than the above example, other methods are possible. For example, only the width of the print sheet may be identified.

Regarding the print data specified by the special sheet size "SPECIAL 001" in FIG. 9, the printable sheet size is previously determined and defined as the size of A4 or Letter. When printing is executed with a B5 size sheet, a part of the print area is outside the sheet and lacks in the print result. However, when there is not a problem in a visibility of the print result even if the magnification of the print data is changed to a B5 size and the data is printed on a B5 size sheet, it may be desirable that the printing of the data is converted and the printing can be carried out. For such cases, the sheet size printable by changing magnification 1104 is defined in the table 1100. Then, when sheet size 1102 of the print data does not match any of the printable sheet sizes 1103, it is determined whether the print data sheet size 1102 matches the sheet size designated by the sheet size printable by changing magnification 1104. Then, when they match, the magnification of the print data is changed to the relevant sheet size and then the printing is executed. In this case, the print data magnification change process may be executed by the printer or the conversion of the print data may be requested from the print server.

Further, according to the description of the present exemplary embodiment, the sheet size determination unit 418 refers to the information of the table 1100 and determines the sheet size of the print data and the sheet size available to the printer. However, the present exemplary embodiment is not limited to this example, and as another example of the present exemplary embodiment, the sheet size determination unit 418 may not have information corresponding to the table 1100. In such a case, when the sheet size of print data is a special sheet size, a determination is made based on a condition which is determined for each special sheet size. When the print data is not a special sheet size, a determination may be made that a sheet size is directly managed by the sheet size management unit 414 and is available to the printer.

<User Interface for Invitation Page Print Request>

FIG. 5 illustrates an example of a web screen which is created by the web print application 302 of the printing system according to the present exemplary embodiment. The web screen is displayed on the web browser 310 of the printer 107 and 108, and used to transmit an invitation page print request to the server 104.

In FIG. 5, a print execution button 601 of the web screen 600 is a button to print an invitation page by the printer. A cancel button 602 is a button to cancel the execution of the invitation page printing.

A user presses the print execution button 601 on the screen of the web screen 600. In response to this, the server 104 generates and stores invitation page print data and job information attached thereto. The server 104 sets a special sheet size to the sheet size information in the job information of the invitation page at this time. The special sheet size here is "SPECIAL 0001" or "SPECIAL 0002" which are sheet sizes defined in the print data sheet size 1102 of the table 1100 (FIG. 9) stored in the sheet size determination unit 418. The printable sheet size 1303 corresponding to the special sheet size is a size in which the entire invitation page can be printed. In other words, when "SPECIAL 0001" or "SPECIAL 0002" is set and printing is allowed (when the sheet size identified by the sensor is included in the printable sheet size 1303), the entire of the allowed page can be printed on the print sheet.

According to the present exemplary embodiment, the server 104 is configured to manage the print data; however, other servers may manage the print data.

<Processing Flow of Invitation Page Print Request>

Figure 6:
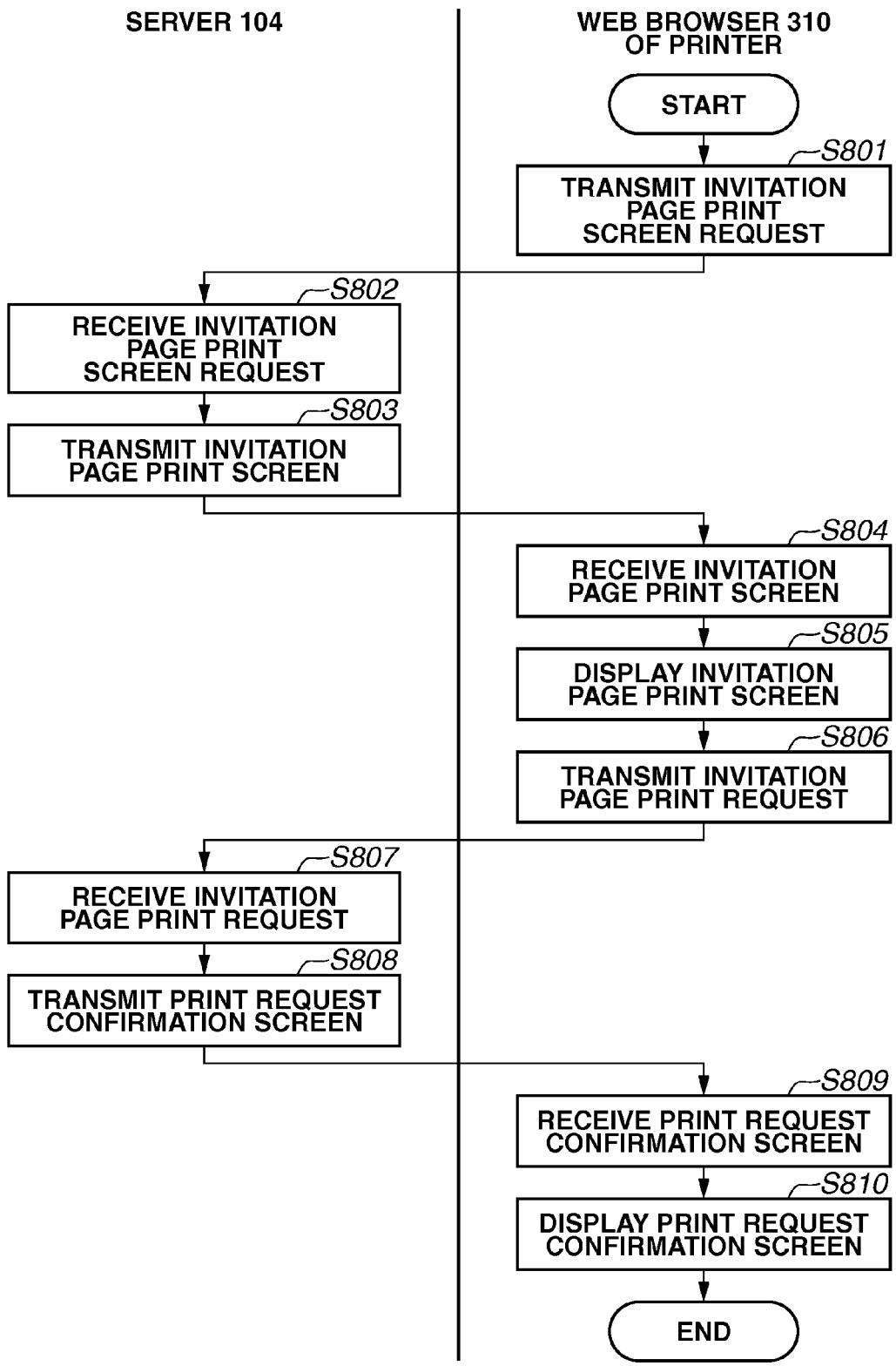
FIG. 6 is a diagram illustrating an operation flow of the server and the web browser for a print request via the invitation page print screen according to the exemplary embodiment.

FIG. 6 is a diagram illustrating a flow that the server 104 of the printing system according to the present exemplary embodiment receives an invitation page print request from the web browser 310 of the printer 107 and 108. In the diagram, the web browser 310 of the printer 107 and 108 executes steps S801, S804 to S806, and S809 to S810, and the server 104 executes other steps.

In step S801, the web browser 310 of the printer 107 and 108 transmits an invitation page print screen request to the request reception unit 407 of the server 104.

In step S802, the request reception unit 407 of the server 104 receives the invitation page print screen request from the web browser 301. In step S803, the invitation page generation unit 406 of the server 104 generates an invitation page print screen (the web screen 600 in FIG. 5). Then, the server 104 transmits data in which the invitation page print screen is written in a HyperText Markup Language (HTML) format to the web browser 310.

In step S804, the web browser 310 receives the invitation page print screen from the request reception unit 407 of the server 104. In step S805, the web browser 310 displays the invitation page print screen. In step S806, when a user presses the print execution button (601 in FIG. 5) on the invitation page print screen, the web browser 310 transmits an invitation page print request to the request reception unit 407 of the server 104. In step S807, the request reception unit 407 of the server 104 receives the invitation page print request transmitted from the web browser 310. In step S808, the invitation page generation unit 406 of the server 104 generates an unillustrated print request reception confirmation screen. Then, the request reception unit 407 of the server 104 transmits the print request reception confirmation screen to the web browser 310. In step S809, the web browser 310 receives the print request reception confirmation screen from the request reception unit 407 of the server 104. In step S810, the web browser 310 displays the print request reception confirmation screen.

In the above procedure, the user can notify the server 104 of an invitation page print request. The server 104 generates invitation page print data.

Figure 7:
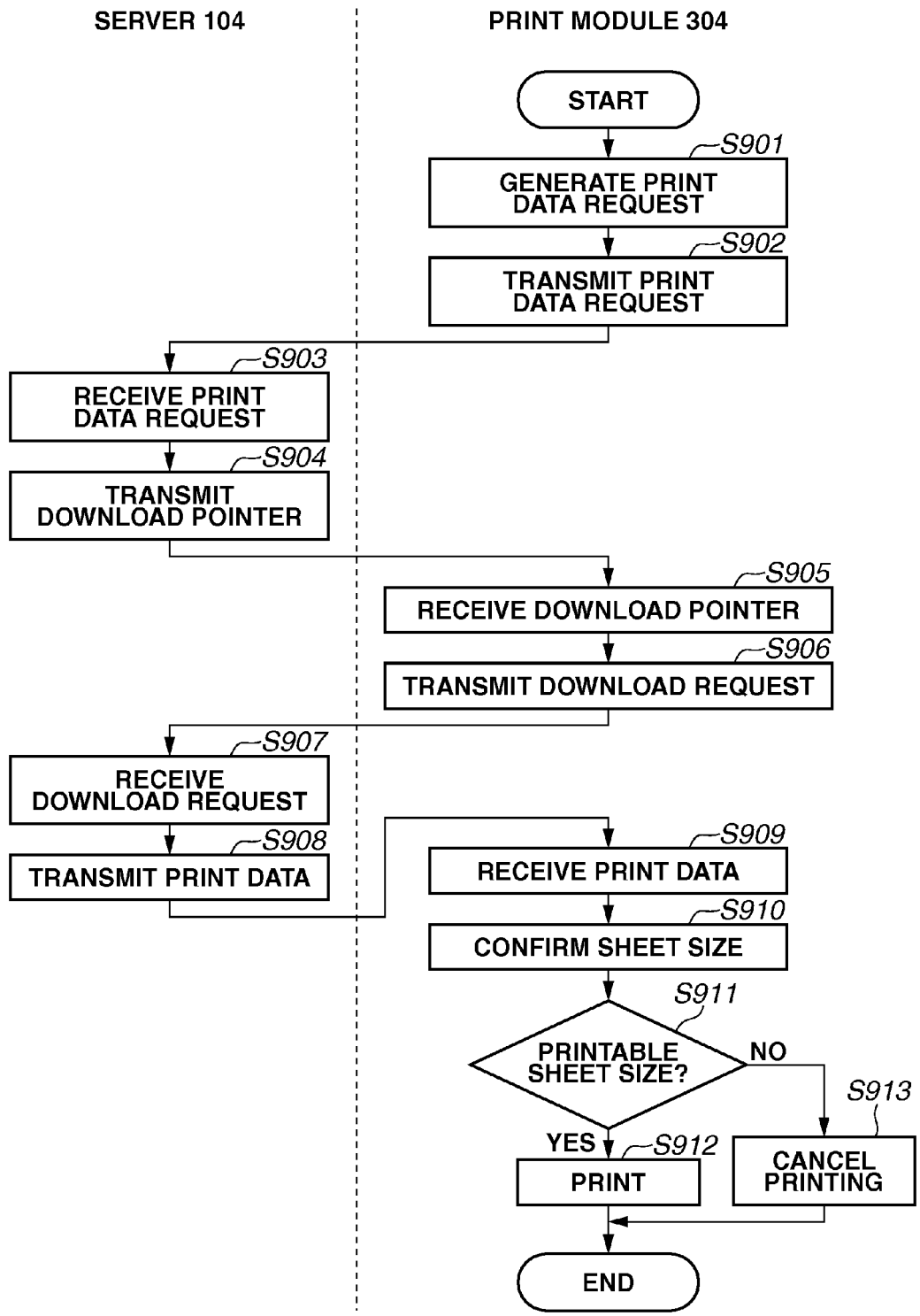
FIG. 7 is a diagram illustrating an operation flow of the server and a print module.

FIG. 7 is a diagram illustrating a flow that the print module 304 of the printer 107 and 108 in the printing system according to the present exemplary embodiment receives a print start request from the server 104, acquires print data from the server 104, and executes printing after determining the sheet size. In the diagram, the server 104 executes steps S903 to S904 and S907 to S908, and the print module 304 executes other steps.

In step S901, the print start request reception unit 410 of the print module 304 generates a print data request in response to a print start request from the print start request transmission unit 417 of the web print back-end service 303. The print data request is written in an Extensible Markup Language (XML) format, for example. In step S902, the web service transmission unit 411 of the print module 304 transmits a print data request to the request reception unit 409 of the web print back-end service 303 of the server 104.

In step S903, the request reception unit 409 of the web print back-end service 303 of the server 104 receives the print data request. In step S904, the request reception unit 409 of the web print back-end service 303 of the server 104 transmits a download pointer that indicates a download source of the print data to the web service transmission unit 411 of the print module 304. The download pointer is a URL, for example.

In step S905, the web service transmission unit 411 of the print module 304 receives the download pointer from the request reception unit 409 of the web print back-end service 303 of the server 104. In step S906, the print data acquisition unit 412 of the print module 304 specifies the download pointer received from the request reception unit 409 of the web print back-end service 303 of the server 104 and transmits a download request.

In step S907, the request reception unit 409 of the web print back-end service 303 of the server 104 receives the download request of the print data specified by the download pointer from the print data acquisition unit 412 of the print module 304. In step S908, the request reception unit 409 of the web print back-end service 303 of the server 104 reads the print data specified by the print data conversion service 311 and transmits the data to the print data acquisition unit 412 of the print module 304. At this point, the server 104 sets a size of the print sheet as print setting of the print data. Particularly, the server 104 sets the special sheet size as the print setting on condition that the print target data is a predetermined type of data such as an invitation page or a print test pattern.

In step S909, the print data acquisition unit 412 of the print module 304 receives the print data.

In step S910, the sheet size determination unit 418 of the print module 304 confirms the sheet size which is set as the print setting of the print target data received in step S909.

In step S911, the sheet size determination unit 418 determines whether the sheet size confirmed in step S910 is the print target sheet size. More specifically, the sheet size determination unit 418 compares the print target sheet size with the sheet size which is available to the printer and is managed by the sheet size management unit 414. In other words, in step S911, the sheet size determination unit 418 determines whether the sheet size identified by the sheet size detection sensor 223 is included in the sizes allowed for printing with the sheet size set as the print setting. In this determination, a sheet size set as the print setting is identified from the print data sheet size 1102 in FIG. 9. The sheet size determination unit 418 determines whether the sheet size identified by the sheet size detection sensor 223 is included in the printable sheet size 1103 corresponding to the identified sheet size. This enables determination whether the entire print target data received in step S909 can be printed on the print sheet set in the printing apparatus.

In step S911, when the sheet size determination unit 418 determines that the sheet size identified by the sheet size detection sensor 223 is included in the sizes allowable for printing (YES in step S911), the process proceeds to step S912 since the entire print target data can be printed. In step S912, the print data transmission unit 416 of the print module 304 sets the sheet size, which is managed by the sheet size management unit 414 and is indicated by the sheet size determination unit 418, as the print data sheet size and transmits the print data to the controller 201. Then, the controller 201 executes printing.

In step S911, when the sheet size determination unit 418 does not determine that the sheet size identified by the sheet size detection sensor 223 is included in the sizes allowable for printing (NO in step S911), the process proceeds to step S913 sine the entire print target data may not be printed. In step S913, the print control unit 415 of the print module 304 notifies a paper mismatch error and cancels the printing.

As described above, according to the present exemplary embodiment, the print sheet size used for printing can be properly identified since the sensor detects the sheet size at the timing that the print data acquisition unit 412 of the print module 304 of the printer 107 and 108 receives the print data.

Figure 8:
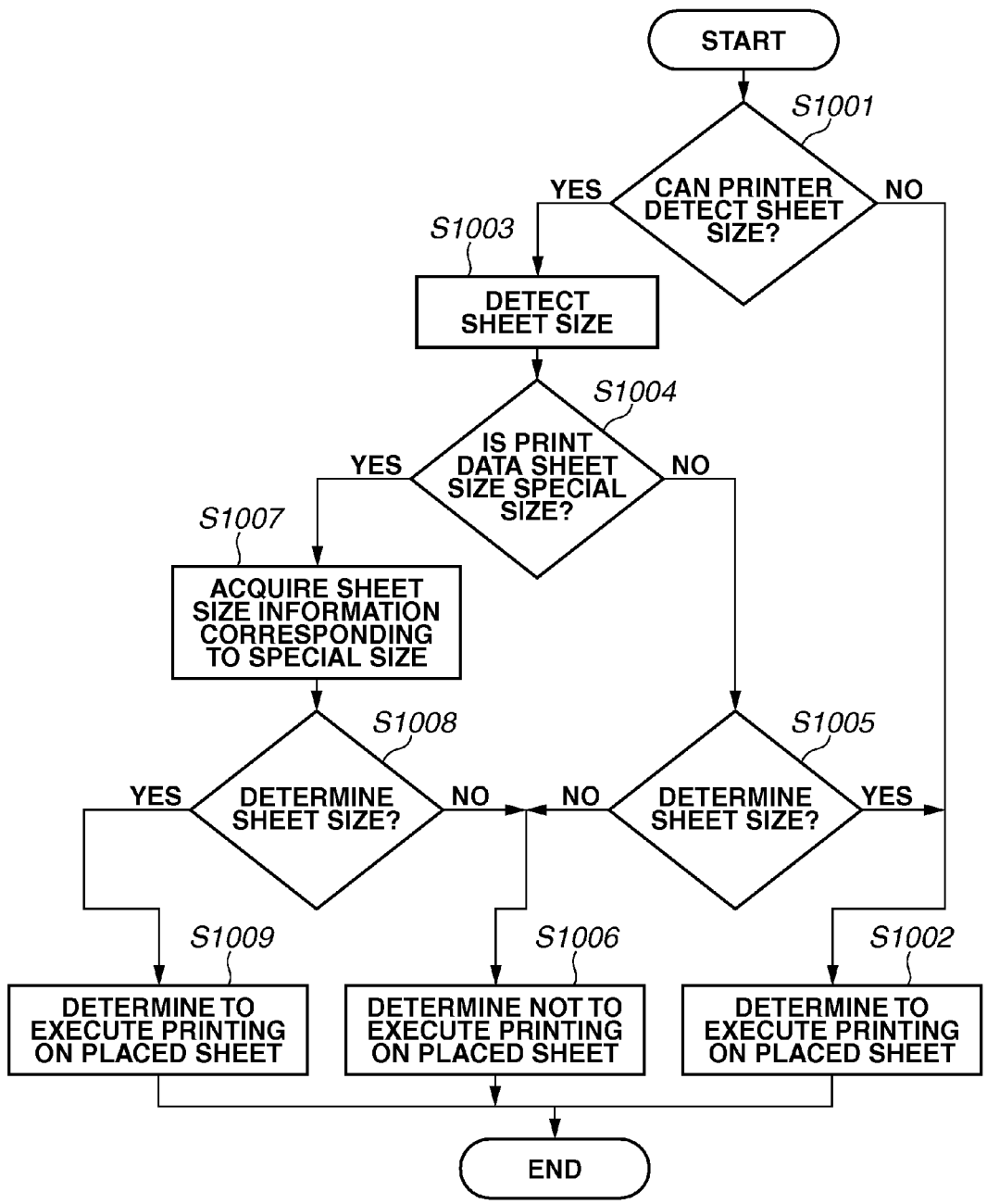
FIG. 8 is a diagram illustrating a sheet size determination flow in a sheet size determination unit.

FIG. 8 is a flowchart describing the determination process executed by the sheet size determination unit 418 of the print module 304 in step S911 in the flow of FIG. 7.

In step S1001, the sheet size determination unit 418 determines whether the printing apparatus has the sheet size detection sensor 223 and whether the sheet size can be detected. If it is determined that the sheet size cannot be detected (NO in step S1001), the sheet size determination unit 418 determines to execute printing the print target data in step S1002. When the sheet size can be detected (YES in step S1001), the sheet size determination unit 418 acquires information of the sheet size available in the printer from the sheet size management unit 414 in step S1003. In this case, the sheet size management unit 414 uses the sheet size detection sensor 223 to detect the size of print sheet currently placed in the printer.

In step S1004, the sheet size determination unit 418 determines whether the sheet size set as the print setting for the print target data is a special sheet size. When the special sheet size is not set (NO in step S1004), in step S1005, the sheet size determination unit 418 compares the sheet size set as the print setting with the size which is detected by the sheet size detection sensor 223 and acquired from the sheet size management unit 414 in step S1003. Then, when they match (YES in step S1005), the sheet size determination unit 418 determines to execute printing of the print data in step S1002. On the other hand, when it is determined that they do not match (NO in step S1005), the sheet size determination unit 418 determines not to execute printing of the print data in step S1006.

In step S1004, when the sheet size set as the print setting is the special sheet size (YES in step S1004), the process proceeds to step S1007. In step S1007, the sheet size determination unit 418 acquires the sheet size information corresponding to the special sheet size from the printable sheet size 1103 defined by the ID 1101 that has the same sheet size in print data sheet size 1102 in the table 1100. In step S1008, the sheet size determination unit 418 compares the sheet size information acquired in step S1007 with the sheet size which is identified by the sensor and acquired from the sheet size management unit 414 in step S1003, and determines whether there is a matching sheet size. When it is determined that there is a matching sheet size in step S1008 (YES in step S1008), the sheet size determination unit 418 determines to execute printing of the received print data in step S1009. On the other hand, when it is determined that the print data sheet size does not match with the sheet size identified by the sensor in step S1008 (NO in step S1008), the process proceeds to step S1006. In step S1006, the sheet size determination unit 418 determines not to execute printing of the print target data.

Although it is not illustrated in the drawing, when the sheet size determination unit 418 determines not to execute printing of the received print target data in step S1006, the sheet size determination unit 418 refers to the table 1100. Then, the sheet size determination unit 418 acquires the sheet size printable by changing magnification 1104 defined by the ID 1101 that has the same sheet size in the print data sheet size 1102 and compares the acquired size with the sheet size, which is identified by the sensor and acquired from the sheet size management unit 414 in step S1003. When there is a matching sheet size, the magnification of the print data is changed corresponding to the matching sheet size and the data is printed by the printer. With this configuration, when the invitation page can be printed by changing magnification corresponding to a particular sheet size, the printing can be completed without a paper error.

Figure 10:
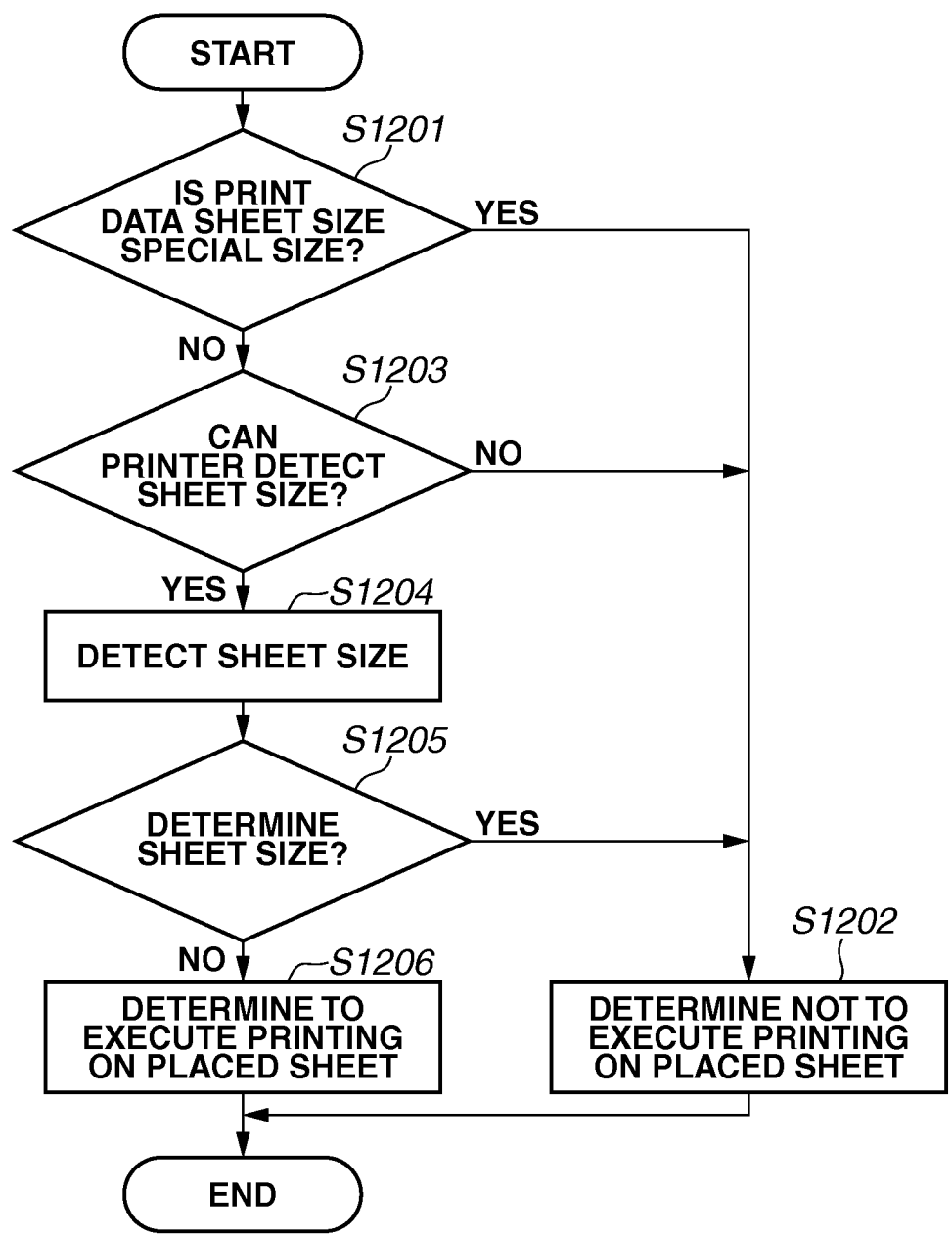
FIG. 10 is a diagram illustrating a sheet size determination flow by the sheet size determination unit.

As another example of the present exemplary embodiment, there is a case that the printing area of the invitation page can be printed with all sheet sizes available to the printer owing to the print data printing area of the invitation page or a limitation of the available sheet caused by a restriction of the printer hardware. In such a case, the printer does not have to execute the sheet size detection (step S1003) and the determination whether print data sheet sizes match (step S1008). FIG. 10 is a flowchart describing such a case of the determination process executed by the sheet size determination unit 418 of the print module 304 in step S910 of the flowchart in FIG. 7. Since other steps are the same as those in the first exemplary embodiment, the descriptions thereof will be omitted.

In step S1201, the sheet size determination unit 418 determines whether the sheet size set in the print data is a special sheet size. When it is determined that the sheet size set in the print data is a special sheet size (YES in step S1201), the sheet size determination unit 418 does not acquire the print data sheet size and the information of a sheet size available in the printer from the sheet size management unit 414 in S1202. Then, the sheet size determination unit 418 determines to execute printing of the print target data. When it is determined that the sheet size set in the print data is not a special sheet size (NO in step S1201), the sheet size determination unit 418 determines whether the printer can detect a print sheet size placed in the printer using the sheet size detection sensor 223 in step S1203. When it is determined that the sheet size cannot be detected (NO in step S1203), the sheet size determination unit 418 determines to execute printing of the print target data in step S1202. When the sheet size can be detected (YES in step S1203), the sheet size determination unit 418 acquires information of the sheet size available in the printer from the sheet size management unit 414 in step S1204. In this case, the sheet size management unit 414 acquires information of the sheet size currently placed and available in the printer using the sheet size detection sensor 223, and returns the information to the sheet size determination unit 418. In step S1205, the sheet size determination unit 418 compares the print data sheet size with the sheet size which is identified by the sensor and acquired from the sheet size management unit 414, and determines whether there is a marching sheet size. In step S1205, when it is determined that the print data sheet size matches the sheet size available in the printer (YES in step S1205), in step S1202, the sheet size determination unit 418 determines that the sheet size for printing the printing area of the received print data is available in the printer. On the other hand, in step S1205, when it is determined that the print data sheet size does not match the sheet size available in the printer (NO in step S1205), in step S1206, the sheet size determination unit 418 determines that the sheet size for printing the printing area of the received print data is not available in the printer.

As another example of the present exemplary embodiment, the printer may have a sensor for detecting a type of a sheet instead of the sheet size detection sensor. Here, as a method for detecting a type of a sheet, a sensor for measuring a reflectance or smoothness of the sheet may be used, for example. Further, the type of a sheet may be detected by reading a barcode printed on the rear surface of the sheet or on an outer circumferential area which is removed after printing. More specifically, the printer will be described that has a sheet type determining function, that is, determines whether the sheet type placed in the printer is a plain paper, a gloss photo paper, or the like. In this case, as a substitute for the table 1100 of FIG. 9 which is the sheet size correspondence information stored in the sheet size determination unit 418, the printer stores correspondence information of the print data sheet type and sheet types printable in the printer as illustrated in table 1400 in FIG. 12. Here, in a print data sheet type 1402, special sheet types of SPECIAL 001 and SPECIAL 002 are defined, similarly to the print data sheet size 1102 in FIG. 9. Then, the print module 304 of the printer determines whether a print data sheet type obtained from the web print back-end service 303 is a special sheet size. For example, in a case where the sheet size is SPECIAL 001, when the sheet type is either the plain paper or recycled paper, the printing is executed; however, when the sheet type is other types such as gloss photo paper, it is determined as a paper type mismatch error. The parts in common with the above description will be omitted.

According to the present exemplary embodiment, the user can obtain a print product of the invitation page when the sheet type is the plain paper or recycled paper. In other words, the user can obtain a print product of the invitation page without wasting expensive gloss photo papers or other types of sheets on which the user may wish to print only contents selected by the user.

In the above example, the method for determining whether to print is based on the sheet types; however, as a substitute for the sheet types, types of ink or types of ink cartridges mounted in the printer may be used to make a determination. In this case, in the table 1400 of FIG. 12, as a substitute for the print data sheet type, the printer stores correspondence information of types of ink or types of ink cartridges mounted in the printer to execute printing for example. In such a case, an equivalent effect is achieved. Here, as a method of allowing a user to select and specify the type of ink or the type of ink cartridge to be used, for example, a function of specifying a color used in printing may be provided. In this case, a user interface can be provided that has options of "color," "monochrome," and "grayscale" as colors for printing and the user can select the colors from the options. Here, the printer compares the color information specified by the user (color information added to the print job) with the ink type or ink cartridge type actually mounted in the printer. Then, based on the comparison result, when it is determined to execute printing, the printer executes the printing process and when it is determined not to execute printing, the printer cancels the printing process.

Figure 11:
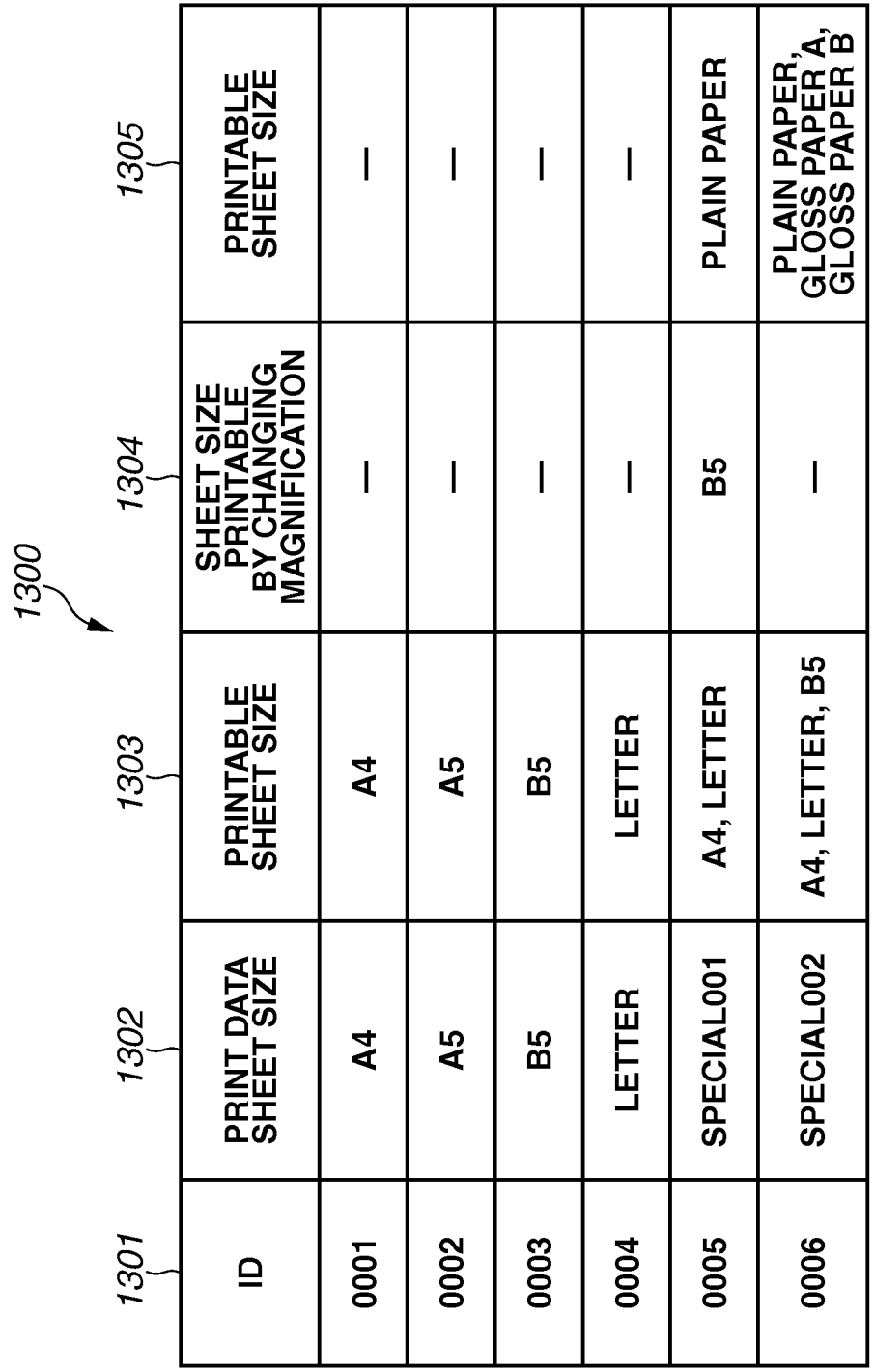
FIG. 11 is a diagram illustrating a sheet size correspondence table stored in the sheet size determination unit of the printer.

Next, as another example of the present exemplary embodiment, a printer including both of the above two types of detection sensors will be described. In this case, information such as the printable sheet size 1305 of table 1300 in FIG. 11 is additionally defined to the sheet size correspondence information stored in the sheet size determination unit 418. In other words, in addition to the sheet size determination, a determination whether it is a sheet type which can be used for the printing is further made.

With this configuration, regarding the printing of an output such as an invitation page, for example, the user can acquire an output product of an appropriate sheet size and a sheet type which is usable for the printing.

Here, in the above description, the sheet size and the sheet type are used in combination to make a determination; however, the invention is not limited to the method. For example, the sheet size and the ink cartridge may be used in combination to make the determination, or the sheet size, the sheet type, and the ink cartridge type may be all used in combination to make the determination. In such cases, equivalent effects can also be obtained.

As described above, according to the present exemplary embodiment, when the special size is set as a set sheet size in print setting, a plurality of candidates corresponding to the set sheet size is identified. In other words, as a size of the print medium in the print setting, the special sheet size is set as predetermined information that enables printing of a plurality of sheet sizes. Then, in a case where predetermined information is set as the print setting, when the print sheet size, which is placed in the printing apparatus and identified by the sensor, is one of the above plurality of sizes, the printing is executed.

Thus, for example, in a case of print target data such as an invitation page which can be printed in either the A4 size or the Letter size, the server 104 sets the special sheet size ("SPECIAL 001") as the print setting. With this configuration, the printing can be executed in any of the A4 size and the Letter size which are identified by the sensor of the printing apparatus. In other words, as a plurality of candidates corresponding to the special sheet sizes, which are larger than the image of the particular type of print target data (an invitation page, a print test pattern, or the like) are previously registered and a special sheet size is set when those particular types of print target data are printed. With this configuration, the entire print target data can be printed.

Further, even when the sensor mistakenly identifies the print sheet of A4 size placed in the printing apparatus as a Letter size due to a detection error by the sensor, for example, the entire print target data can be printed on the A4-size print sheet.

Further, when the print sheet size, which is placed in the printing apparatus and identified by the sensor, is not A4 or Letter but a small print sheet such as Photo L or the like, the printing is not executed. This can prevent the image of the invitation page or the like from being printed with one part of the image missing. Further, when the image of the invitation page or the like is printed on a small print sheet such as Photo L by changing the magnification, the content may be difficult to be recognized by the user. According to the present exemplary embodiment, since the Photo L size is not specified for the special sheet size, the printing is not executed and the printing by changing magnification can be prevented.

Further, according to the present exemplary embodiment, when a predetermined sheet size in the print setting of a print job is set, a condition used to determine whether the sheet size identified by the sensor and the set sheet size in the print setting match with each other can be relaxed. Thus, the above described processes can be carried out to realize appropriate printing without transmitting a special command separately from the print job.

In addition to the case that the special sheet size is set as the print setting as described in the exemplary embodiment, for example, there may be a case that a plurality of sheet sizes such as "A4 size or Letter size" can be set as the print setting. In this case, when a size of sheet identified by the sensor is any of sizes set as the printing setting, printing can be executed. Further, the printing in a plurality of allowed sizes determined in advance is not limited to a case of specifying with the special sheet size. For example, the printing may be accepted in a plurality of previously determined sizes based on other information in the print setting or information different from the print setting transmitted from an apparatus, which transmits a print job, to the printing apparatus.

Further, the above exemplary embodiment describes an example that the server on the network transmits as an information processing apparatus the print setting or print data to the printing apparatus. However, in addition to this example, the processes of the present exemplary embodiment may be realized by a smart device such as a host computer, a smartphone, a tablet computer, or the like, which is connected to the printing apparatus and causes the printing apparatus to execute printing, working as the information processing apparatus of the present exemplary embodiment. Further, a controller such as a CPU in the printing apparatus may work as the information processing apparatus of the present exemplary embodiment, as a substitute for the server.

More specifically, when a controller in a host computer, a smart device, or a printing apparatus causes the printing apparatus to execute printing, the controller sets the special size as the print setting. Thus, the printing can be executed in any size adaptable to the special size, which is identified by the sensor of the printing apparatus.

Further, the above exemplary embodiment describes as an example, the CPU 210 included in the printing apparatus operating as a printing control apparatus. However, in addition to this example, the processes of present exemplary embodiment may be executed by the information processing apparatus such as a host computer or a server, which is connected to a printing apparatus and causes the printing apparatus to execute printing, working as a printing control apparatus of the present exemplary embodiment.

More specifically, when a host computer, a server, or a smart device transmits a print job to the printing apparatus, the width of the print sheet detected by the sensor of the printing apparatus is acquired. Then, the sheet size having a width corresponding to the acquired width is compared with the set sheet size in the print setting.

Further, in addition to the case that the sheet size is automatically determined by a sensor as described in the above exemplary embodiment, for example, a user may specify, on the operation panel of the printing apparatus, the size of the sheet stored in the cassette of the printing apparatus or the sheet the user places at a paper feed port of the printing apparatus. Then, the process of the above exemplary embodiment may be executed by applying the size specified by the user as a substitute for the sheet size automatically determined by the sensor of the exemplary embodiment.

Here, the above described designation by the user may be made at any timing. For example, a sensor for detecting the opening and closing of the cassette of the printing apparatus or a sensor for detecting whether there is a sheet in a paper feed port is provided to the printing apparatus. When the sensor detects that the cassette is opened and then closed or that a sheet is inserted to the paper feed port, the operation panel of the printing apparatus displays a screen so that the user can specify the sheet size or sheet type. Then, the size specified on the screen by the user may be used as the size determined by the sensor in the exemplary embodiment.

In this case, one or more of particular sheet size selectable by the user is set as the size acceptable for printing by making the special sheet size setting. In other words, when the special sheet size is set as the print setting and the sheet size selected by the user is one or more of the above particular sheet sizes, printing is executed. Then, the printing may be restricted when other sheet sizes are selected.

Further, the above exemplary embodiment has described the print sheets as an example of print mediums on which the printing apparatus prints an image; however, in addition to this example, an overhead projector (OHP) sheet may be used. Further, in addition to the rectangular print medium such as a print sheet, a disk-shaped recording media such as a compact disk (CD), a digital versatile disk (DVD) may be employed.

The functions of the present exemplary embodiment may be realized by a following configuration. The functions can be realized by supplying a program code for executing the processes of the present exemplary embodiment to the system or the apparatus and executing the program code by a computer (a CPU or a micro-processing unit (MPU)) of the system or the apparatus. In this case, the program code read from a storage medium itself realizes the functions of the above exemplary embodiment and the storage medium storing the program code also realizes the functions of the present exemplary embodiment.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Further, the program code for realizing the functions of the present exemplary embodiment may be executed by a single computer (a CPU, an MPU) or may be executed by a plurality of computers in combination. In addition, the program code may be executed by a computer or a hardware device such as a circuit for realizing the function of the program code may be provided. Alternatively, a part of the program code may be realized by a hardware and other parts may be realized by a computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-137043 filed Jun. 28, 2013, which is hereby incorporated by reference herein in its entirety.

What is claimed is:

1. A printing control apparatus comprising:
an acquisition unit configured to acquire a candidate of a size of a print medium being set in a printing unit;
a determination unit configured to determine whether the candidate acquired by the acquisition unit is included in acceptable sizes corresponding to information set as a print medium size in a print setting of print target data, the acceptable sizes being a part of a plurality of sizes in which the printing unit can print an image; and
a print control unit configured to control the printing unit to print an image based on the print target data on the print medium if the determination unit determines that the candidate is included in the acceptable sizes, wherein the printing unit does not print the image on the print medium if the determination unit determines that the candidate is included in the plurality of sizes and is not included in the acceptable sizes.

2. The printing control apparatus according to claim 1, if the information is set as a print medium size in the print setting of the print target data, the determination unit executes the determination.

3. The printing control apparatus according to claim 2, wherein if the information is not set and the candidate acquired by the acquisition unit is set as the print setting, the print control unit controls the printing unit to print the image in accordance with the candidate.

4. The printing control apparatus according to claim 3, wherein the printing unit does not print the image on the print medium if the information is not set and the candidate acquired by the acquisition unit is not set as the print setting.

5. The printing control apparatus according to claim 1, further comprising:
a reception unit configured to receive a print job from an external device,
wherein the information is set as the print medium size in the print setting corresponding to the print job received by the reception unit.

6. The printing control apparatus according to claim 5, wherein the external device sets the information on condition that the print target data is data including access information.

7. The printing control apparatus according to claim 6, wherein the access information is a URL for registering a user to a cloud printing service.

8. The printing control apparatus according to claim 5, wherein the external device is a web server.

9. The printing control apparatus according to claim 1, wherein first information or second information can be set as the print medium size in the print setting of the print target data,
and the second information corresponds to an acceptable size to which the first information does not correspond.

10. The printing control apparatus according to claim 1, wherein the acceptable sizes corresponding to the information is registered in the printing control apparatus, and the determination unit executes the determination, based on the registered acceptable sizes.

11. The printing control apparatus according to claim 1, wherein the printing control apparatus comprises the printing unit.

12. The printing control apparatus according to claim 11, further comprising a requesting unit configured to transmit a request for print target data to a web server,
wherein the determining unit executes the determination for the print target data received in response to the request transmitted by the requesting unit.

13. The printing control apparatus according to claim 1, wherein the acquisition unit acquires the candidate of the size obtained by detecting a size of the print medium with a sensor included in the printing control apparatus.

14. The printing control apparatus according to claim 13, wherein, of a width and a length of the print medium, the sensor detects only the width,
and the acquisition unit acquires the width detected by the sensor and the length determined by the width, as the candidate of the size.

15. The printing control apparatus according to claim 1, wherein the acquisition unit acquires the candidate of a size designated by a user.

16. The printing control apparatus according to claim 15, further comprising a display unit configured to display a screen for designating a size of the print medium being set in the printing unit,
wherein the acquisition unit acquires the size designated by the user in the screen displayed by the display unit, as the candidate of the size.

17. The printing control apparatus according to claim 16, further comprising a sensor for detecting closing of a cassette on which a print medium is placed,
wherein the display unit displays the screen, in a case where the sensor detects closing of the cassette.

18. The printing control apparatus according to claim 16, further comprising a sensor for detecting whether there is a print medium on a feed port for feeding the print medium,
wherein the display unit displays the screen, in a case where the sensor detects that there is a print medium on the feed port.

19. The printing control apparatus according to claim 1, wherein the print control unit controls the printing unit to print the image on the print medium in accordance with one of the acceptable sizes, if the determination unit determines that the candidate is included in the acceptable sizes.

20. The printing control apparatus according to claim 19, wherein the print control unit controls the printing unit to print the image on the print medium in accordance with the candidate of the size, if the determination unit determines that the candidate is included in the acceptable sizes.

21. A printing control method comprising:
acquiring a candidate of a size of a print medium being set in a printing unit;
determining whether the acquired candidate is included in acceptable sizes corresponding to information set as a print medium size in a print setting of print target data, the acceptable sizes being a part of a plurality of sizes in which the printing unit can print an image; and
controlling the printing unit to print an image based on the print target data on the print medium if it is determined that the candidate is included in the acceptable sizes, wherein the printing unit does note print an image on the print medium if it is determined that the candidate is included in the plurality of sizes and is not included in the acceptable sizes.

22. A non-transitory storage medium configured to store a program for causing a computer to execute the printing control method according to claim 21.

23. A printing control apparatus comprising:
an acquisition unit configured to acquire a candidate of a size of a print medium being set in a printing unit; and
a print control unit configured to control the printing unit to print an image on the print medium if the candidate of the size acquired by the acquisition unit is included in acceptable sizes which are a part of a plurality of sizes in which the printing unit can print an image,
wherein the printing unit does not print the image on the print medium if the candidate is included in the plurality of sizes and is not included in the acceptable sizes.

24. A printing control method comprising:
acquiring a candidate of a size of a print medium being set in a printing unit; and
controlling the printing unit to print an image on the print medium if the acquired candidate of the size is included in acceptable sizes which are a part of a plurality of sizes in which the printing unit can print an image,
wherein the printing unit does not print the image on the print medium if the candidate is included in the plurality of sizes and is not included in the acceptable sizes.

* * * * *